United States Patent [19]

Danner

[11] Patent Number: 5,290,436
[45] Date of Patent: Mar. 1, 1994

[54] AQUARIUM FILTER

[76] Inventor: Eugene Danner, 39 Glenrich Dr., St. James, N.Y. 11780

[21] Appl. No.: 987,719

[22] Filed: Dec. 9, 1992

[51] Int. Cl.$^5$ ............................................. A01K 63/04
[52] U.S. Cl. ................................ 210/169; 210/416.2; 119/259
[58] Field of Search ................ 210/169, 416.2; 119/5

[56] References Cited

U.S. PATENT DOCUMENTS

| | | | |
|---|---|---|---|
| 3,513,978 | 5/1970 | Newsteder | 119/5 |
| 4,206,719 | 6/1980 | Faris | 119/5 |
| 4,512,885 | 4/1985 | Willinger | 210/169 |
| 4,783,258 | 11/1988 | Willinger et al. | 210/416.2 |
| 4,997,559 | 3/1991 | Ellis et al. | 210/416.2 |
| 5,078,867 | 1/1992 | Danner | 210/169 |

Primary Examiner—Stanley S. Silverman
Assistant Examiner—Robert James Popovics
Attorney, Agent, or Firm—Galgano & Burke

[57] ABSTRACT

An externally-mounted aquarium filter assembly includes a tank which is supportable on a wall of an aquarium and partitions disposed in the tank for dividing the interior of the tank into a prefilter chamber and a post-filter chamber. The partitions include a pair of generally upstanding, spaced-apart first and second partitions, each of which has an opening therein to allow the passage of water from the prefilter chamber to the post-filter chamber and a raised partition base plate on which the partitions are supported, the partitions each defining an opening to establish communication between the chambers. A pair of filter cartridges are each independently removably mounted within one of the openings of the partitions so that water passing from the prefilter chamber to the post-filter chamber passes through the filter cartridges for trapping particulate matter in the water.

3 Claims, 4 Drawing Sheets

AQUARIUM FILTER

BACKGROUND OF THE INVENTION

The present invention related to filtration systems for aquariums. More particularly, it relates to an external filter system utilizing filter cartridges as the primary means of filtration.

External aquarium filters employing a filter cartridge are regularly used for the purpose of filtration and cleaning of aquarium water. The aquarium water is cleaned in part by mechanical removal of particulate fish waste. The chemical waste is removed by aerobic bacterial means. The filter cartridge provides a substrate for screening out particulate matter. The substrate also provides a surface on whic aerobic bacteria may live and adhere to.

When the cartridge eventually becomes clogged by trapped detrius and organic wastes, it must then be removed and cleaned or replaced by a new filter substrate. The time interval between changing the cartridge is dependant upon the quantity and size of fish as well as the flow rate of contaminated water through the filter. The physical size of the cartridge or the number of cartridges also determines the time interval.

In prior art devices such as U.S. Pat. Nos. 4,512,885 and 5,078,867, the cartridge size is limited by the depth and width of the filter assembly. The flow rate of this type filter is restricted by the filter cartridge area, and the cartridge needs to be replaced often. Only one filter cartridge can be placed in the filter chamber. The cartridge slides into tracks which are an intergral part of the filter chamber in the external filter and pump assembly. The tracks allow easy replacement of the cartridge when it needs to be replaced.

SUMMARY OF THE INVENTION

It is therefore an object of the present invention to provide an aquarium filtration system which minimizes the aforementioned problem of having to change the cartridge often.

Another object of the invention is to provide such a system having a single filter chamber which accommodates two cartridges, thereby doubling the total area of the substrate exposed to the water flow.

Yet another object of the invention is to provide an aquarium filter assembly and cartridge which is adaptable to provide different pumps and flow rates to accommodate variously sized aquariums.

Certain of the foregoing and related objects are readily attained according to the present invention by the provision of an externally-mounted aquarium filter assembly comprising a tank having means to support the tank on a wall of an aquarium and partition means disposed in the tank for dividing the interior of the tank into a prefilter chamber and a post-filter chamber. The partition means comprises a pair of generally upstanding, spaced-apart first and second partitions, each of which has an opening therein to allow the passage of water from the prefilter chamber to the post-filter chamber and a raised partition base plate on which the partitions are supported, the partitions each defining an opening to establish communication between the chambers. A pair of filter cartridges are each independently removably mounted within one of the openings of the partitions so that water passing from the prefilter chamber to the post-filter chamber passes through the filter cartridges for trapping particulate matter in the water.

Preferably, the prefilter chamber occupies the tank space defined between the partitions and above the partition base plate and the post-filter chamber occupies the remaining tank space outwardly of the partitions with the partition plate defining a passageway therebelow for establishing communication between the remaining tank space disposed outwardly of the partitions.

Most desirably, the partition means comprises track means for slidably receiving the filter cartridges and the base partition plate. Most advantageously, the support means comprises a spillway for returning water in the second region to the aquarium.

BRIEF DESCRIPTION OF THE DRAWINGS

Other objects and features of the present invention will become apparent from the following detailed description considered in connection with the accompanying drawings which discloses one embodiment of the present invention. It should be understood, however, that the drawings are designed for the purpose of illustration only and not as a definition of the limits of the invention.

In the drawings, wherein similar reference characters denote similar elements throughout the one view.

DETAILED DESCRIPTION OF THE PREFERRED AND ILLUSTRATED EMBODIMENT

The following description is only one means of carrying out the invention. This description is made for the purposes of illustration and is not to be taken in a limiting sense.

Figure 1:
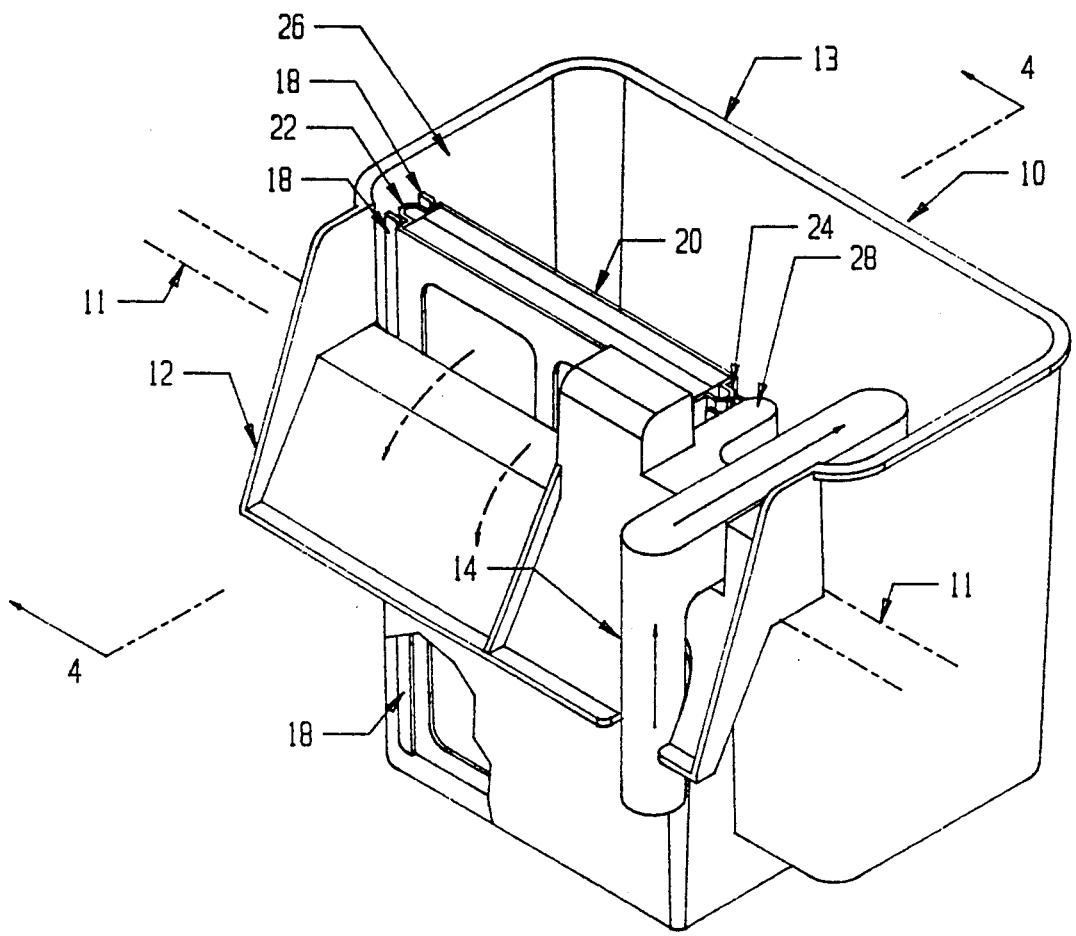
FIG. 1 is a perspective view of a prior art device having support means for only one cartridge.

Turning now in detail to the drawings, referring to FIG. 1, there is shown an aquarium filter and pump assembly 10 made according to the prior art (e.g., see U.S. Pat. No. 5,078,867, which is incorporated herein by reference thereto). Assembly 10 is mounted on the side wall of an aquarium 11 with the spillway 12 overlapping into the aquarium. Water is drawn into and fills tank 13 through a suction hose 14 by a pump assembly (not shown) located inside of tank 13. Cleansed water is returned to the aquarium over spillway 12 (shown by the arrows) after passing through a removable filter cartridge assembly 20, the generally U-shaped lateral ends of which are slidably mounted in complementary configured and dimensional grooves 22 and 24 defined between flanges 18, formed on side wall 26 and a wall 28.

Figure 2:
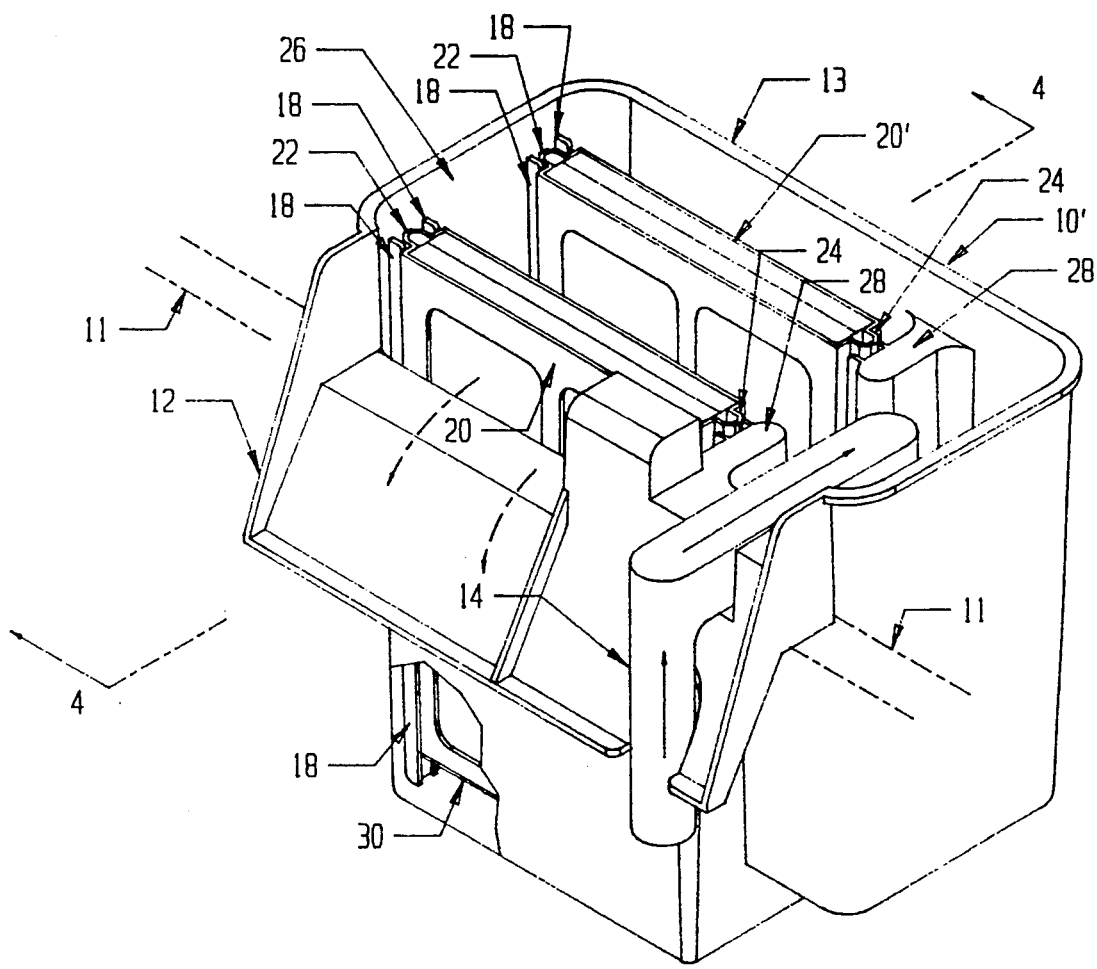
FIG. 2 is a perspective view of a preferred embodiment of the present invention incorporated into a typical aquarium filter and pump assembly, mounted on the outside of an aquarium.

Referring to FIG. 2, an aquarium filter and pump assembly 10' according to the present invention is shown which is similar to assembly 10 in that it is mounted on the side wall of an aquarium 11 with the spillway 12 overlapping into the aquarium. Water is drawn into and fills tank 13 through a suction tube 14 by a pump assembly (not shown) located inside of tent 13. However, cleansed water is returned to the aquarium over spillway 12 (shown by arrows) after passing through dual filter cartridges 20 and 20' which are removably mounted in a manner similar to the single cartridge of FIG. 1. More particularly, the U-shaped lateral ends of the filter cartridges are received in complementary dimensioned and configured grooves 22, 24 formed between flanges or tracks 18 formed on side wall 26 and wall 28.

Figure 3:
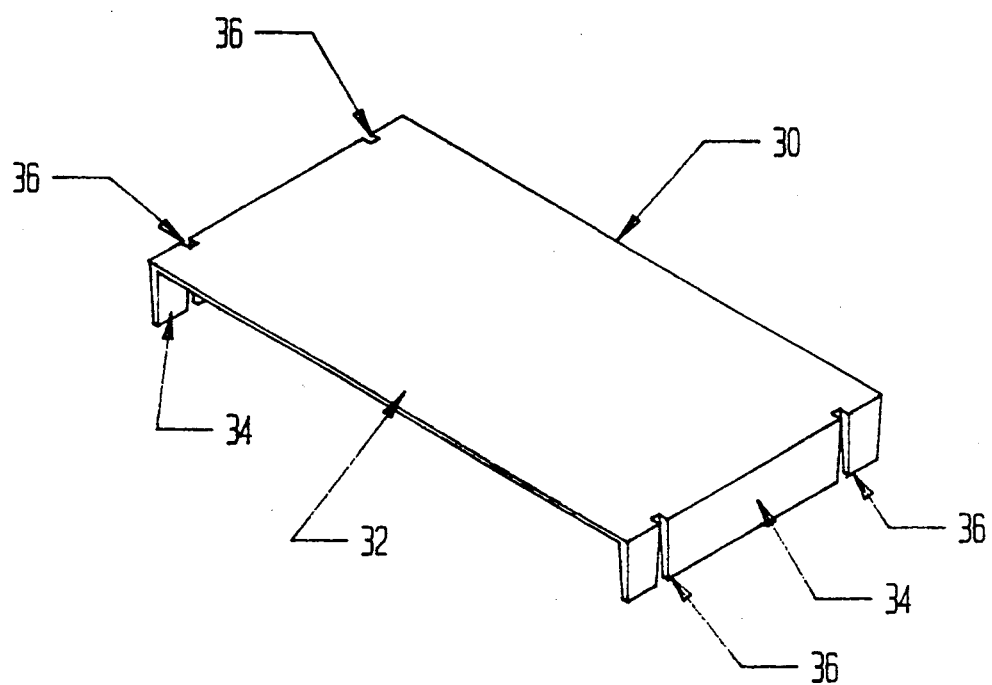
FIG. 3 is a perspective view of the filter assembly partition plate.
Figure 4:
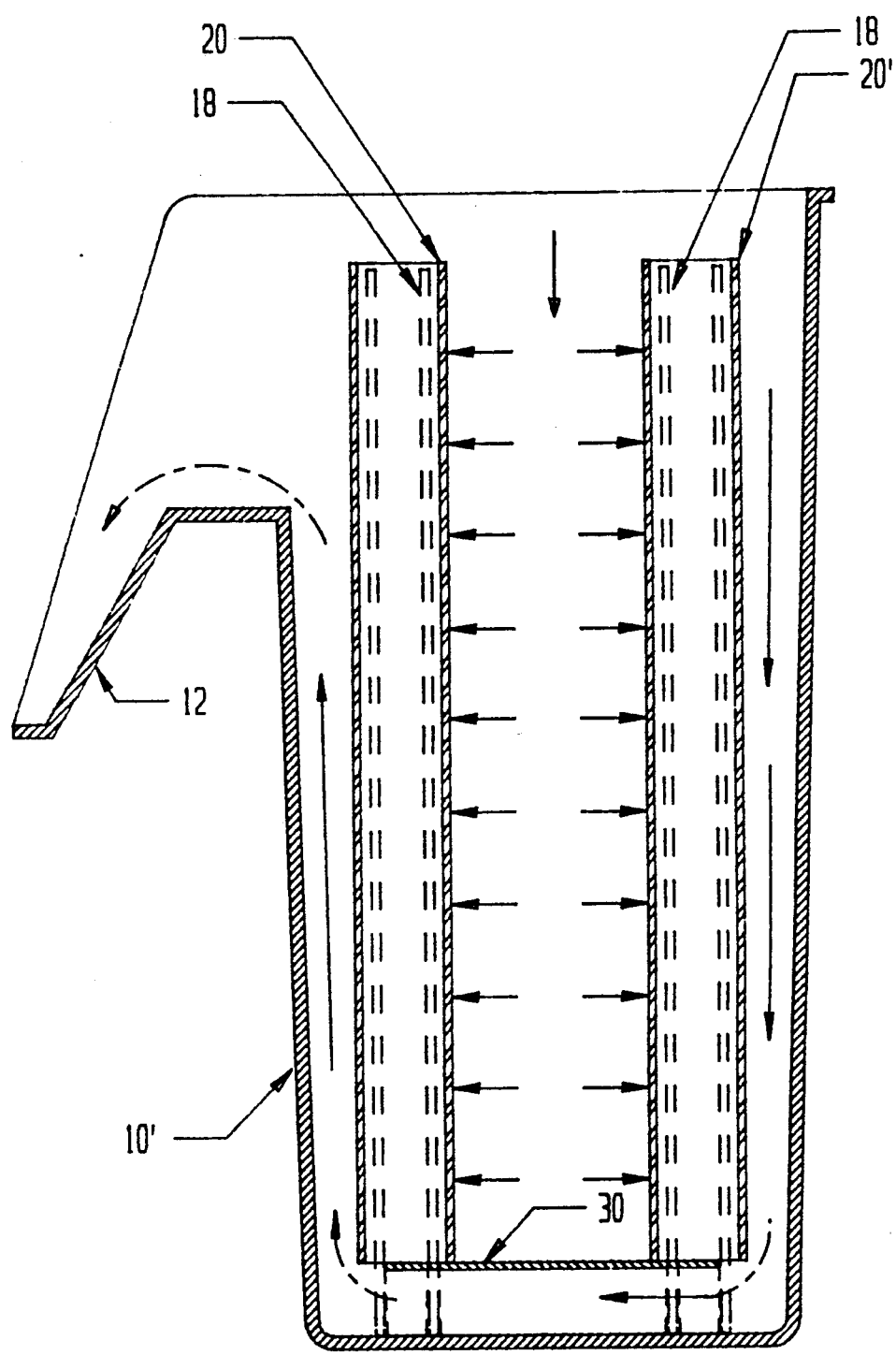
FIG. 4 is a sectional view taken along line 4—4 of FIG. 2, with portions of the filter cartridges removed for purposes of clarity.

As shown in FIG. 4, the filter cartridges 20, 20' are supported on a partition plate 30. As shown in FIG. 3, the partition plate 30 has an inverted generally U-shaped profile composed of a base wall 32 and upstanding supporting end walls 34 in which are formed grooves 36, each of which slidably mates with one of the flanges 18 to fix the position of plate 30 in tank 13. As seen best in FIG. 4, water from the suction hose 14 enters the inner or pre-filter chamber defined between the dual cartridges 20, 20' and partition plate 30 (in the general direction of downwardly-pointing arrow), passes through one of the dual cartridges is a post-filter chamber, and is returned to the opening via spillway 12. When cleansed water flows through the second filter cartridge 20', it passes under the partition plate 30 and up the inside of tank 13 and back into the aquarium via the spillway 12.

In summary, the present invention provides a filter which is more versatile from a manufacturers tooling cost point of view and performance point of view. The filter, according to the present invention, allows different pumps and flow rates for variously sized aquariums, i.e., one with a low water flow rate and another with two cartridges and a higher water flow rate. This allows tooling for one size filter assembly to be used for the production of other models. It also allows the same cartridge to be used in all models of a given manufacturers product line. This allows the cost saving on tooling for the manufacture of various size filters. This also alleviates the need for a retail store to inventory various sizes of replacement filter cartridges.

Accordingly, while only certain preferred embodiments of the present invention have been shown and described, it is to be understood that many changes and modifications may be made thereunto without departing from the spirit and scope of the invention as disclosed herein.

What is claimed is:

1. An externally-mounted aquarium filter assembly comprising:
   a tank having means to support said tank on a wall of an aquarium;
   partition means disposed in said tank for dividing the interior of said tank into a pre-filter chamber and a post-filter chamber, said partition means comprising a raised partition base plate and a first and second pair of generally upstanding, spaced-apart track means, each pair of which define an opening therebetween for the receipt of a filter cartridge, which openings further establish communication between said chambers, said pre-filter chamber occupying the tank space defined between said track means and said post-filter chamber occupying the remaining tank space outwardly of said track means with said partition plate defining a passageway therebelow for establishing communication between said remaining tank space disposed outwardly of said track means;
   a pair of filter cartridges, each of which is independently removably mounted within said openings of said track means so that water passing from said pre-filter chamber to said post-filter chamber passes through said filter cartridges for trapping particulate matter in said water;
   inlet means mounted on said tank for introducing water from the aquarium to said pre-filter chamber; and
   outlet means mounted on said tank for returning water from said post filter chamber to the aquarium.

2. The filter assembly according to claim 1, wherein said inlet means comprises a siphon tube.

3. The filter assembly according to claim 1, wherein said outlet means comprises a spillway.

* * * * *